United States Patent [19]

LaRou et al.

[11] Patent Number: 4,537,519

[45] Date of Patent: Aug. 27, 1985

[54] SHAFT LOCKING DEVICE FOR BEARING ASSEMBLIES

[75] Inventors: Albert M. LaRou, Naperville; Eldon A. Atteberry, Aurora, both of Ill.

[73] Assignee: Emerson Electric Co., St. Louis, Mo.

[21] Appl. No.: 650,452

[22] Filed: Sep. 14, 1984

[51] Int. Cl.$^3$ .......... F16C 35/063

[52] U.S. Cl. .......... 384/478; 384/513; 384/537

[58] Field of Search .......... 384/513, 537, 585, 495, 384/540, 478

[56] References Cited

U.S. PATENT DOCUMENTS

| | | | |
|---|---|---|---|
| Re. 17,838 | 10/1930 | Gayman | 384/537 |
| Re. 26,591 | 5/1969 | Kay | 384/585 |
| 3,304,140 | 2/1967 | Hornigold | 384/537 |
| 3,428,379 | 2/1969 | Readman | 384/537 |

*Primary Examiner*—Lenard A. Footland
*Attorney, Agent, or Firm*—Polster, Polster and Lucchesi

[57] ABSTRACT

A shaft locking device for bearing assemblies wherein inner ring finger extensions of the bearing assembly include recessed grooved areas therein at a position remote from the extremities, the grooves being of sufficient breadth and depth to convert shearing stress along such area to bending stress to increase locking tightness and improve radial and thrust accommodation capacity.

9 Claims, 5 Drawing Figures

SHAFT LOCKING DEVICE FOR BEARING ASSEMBLIES

BACKGROUND OF THE INVENTION

The present invention relates to bearing assembly arrangements and, more particularly, to a shaft locking arrangement for bearing assemblies.

Various arrangements are known in the art to secure the inner ring of a bearing assembly to a rotating shaft with as strong a physical locking force being exerted as is reasonably possible to insure secure locking to a shaft with maximum accommodation for radial and thrust or axial loads or either of them on the shaft. Such arrangements have included shaft bearing set screws, plural locking or tightening means on a shaft surrounding collar with double screw arrangements and, more recently, the patented SKWEZLOC® arrangement which includes equally spaced inner ring finger extensions which, when locked with a single screw locking collar, serves to grip and hold a shaft and the inner ring tightly in position allowing near-perfect concentricity of the inner ring with the shaft and higher shaft speeds.

The novel features of the present invention can be utilized in combination with any one of a number of known force applying arrangements for securing a bearing assembly to a shaft and are particularly adaptable to the compressible collar and inner ring finger extensions of the known SKWEZLOC® arrangement resulting in the concomitant advantages of near-perfect shaft-ring concentricity and an increased capacity for locking under high loads and for high shaft operating speeds. Further, the present invention provides a new and useful shaft locking arrangement which is straightforward and economical in manufacture, operation and assembly, requiring a minimum of tooling and parts but requiring no additional assembly steps. Moreover, the arrangement of the present invention serves to increase shaft locking capacity with improved accommodation for radial and thrust or axial loads, or either of them, accomplishing a locking capability of two tightening screws with only one screw by placing inner ring extensions during shaft locking in less shear and more bending through a unique and novel arrangement wherein radial forces are exerted on the outermost portions of inner ring extensions with the inner most portions being relieved to convert what would otherwise be shear stresses to bending stresses.

Various other features of the present invention will become obvious to one skilled in the art upon reading the disclosure set forth herein.

SUMMARY OF THE INVENTION

More particularly, the present invention provides a bearing assembly comprising: inner and outer annular bearing rings, each including bearing raceways positioned in opposed annular spaced relation to each other; a rolling element loaded annular cage mounted in the space between the opposed raceways with the rolling elements therein engaging in the opposed raceways; the inner bearing ring including slotted inner ring finger extensions extending in cantilever fashion from at least one end thereof; and force means to compress the inner ring finger extensions when such inner ring finger extensions are mounted on a shaft to lock the inner ring tightly to the shaft; the inner ring finger extensions having a recessed annular grooved area extending at least partially therearound in spaced relation from the outer ends of the finger extensions and being of sufficient breadth and depth to convert what would otherwise be shearing stresses along such area to bending stresses and thus improve radial and thrust accommodation capacity and rotational torque transmission.

It is to be understood that various changes can be made by one skilled in the art in the arrangment, form and construction of the disclosed novel bearing assembly without departing from the scope or spirit of the present invention.

BRIEF DESCRIPTION OF THE DRAWINGS

Referring to the drawings which disclose one advantageous embodiment of the present invention.

DETAILED DESCRIPTION OF A PREFERRED EMBODIMENT

Figure 1:
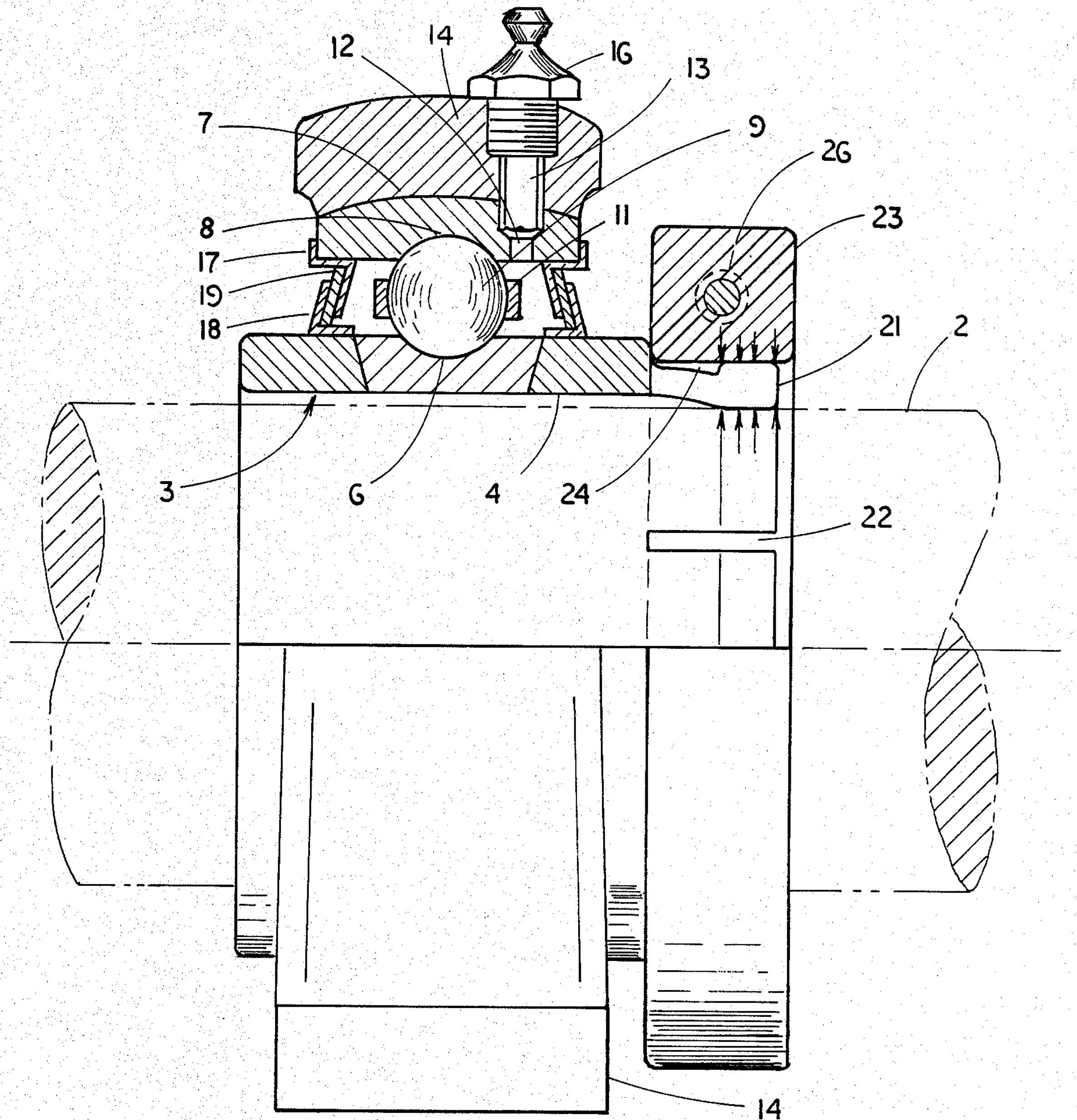
FIG. 1 is a partially broken away cross-sectional view of a bearing assembly mounted in a housing or pillow block, the assembly including the novel shaft locking device in engagement with a shaft, clearance between the shaft and the bearing assembly being exaggerated to emphasize the inventive features of the locking device.
Figure 3:
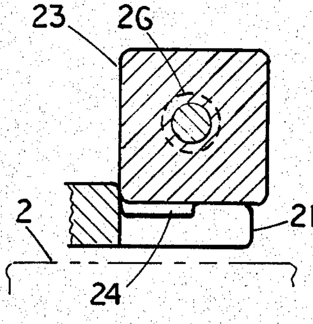
FIG. 3 is an exaggerated schematic view of a portion of the bearing assembly of FIGS. 1 and 2 showing the relative position of the inner ring extensions and a shaft at the commencement of locking force application.
Figure 4:
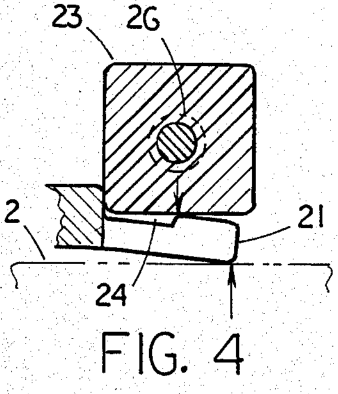
FIG. 4 is a view similar to FIG. 3 showing the relative position of the ring extensions and shaft at an intermediate stage of locking force application.
Figure 5:
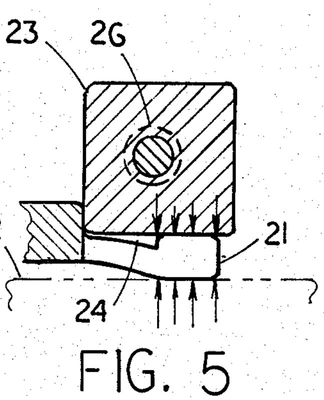
FIG. 5 is a view similar to FIGS. 3 and 4 showing the relative position of the ring extensions and shaft at the final stage of locking force application.

Referring to the drawings, shaft 2 is disclosed in FIG. 1 as passing through bearing assembly 3. Assembly 3 includes annular inner ring 4 having a grooved raceway 6 which is wear hardened to extend the bearing life. Surrounding annular inner ring 4 in spaced relation therefrom, is annular outer ring 7 having grooved raceway 8 disposed therein in opposed relationship to inner ring raceway 6, the raceways serving to receive in nesting relationship therewith a plurality of spaced ball or rolling elements 9 mounted in rolling element pockets of rolling element cage 11. A lubricating passage 12 is provided in outer bearing ring 7 which is aligned with a passage 13 in bearing assembly housing or pillow block 14 in which bearing assembly 3 is mounted. A suitable threaded castellated adaptor or grease fitting 16 serves to seal aligned lubricating passages 12 and 13. To seal the rolling element cage assembly, annular inner flingers 17 and outer flingers 18 with annular seals therebetween are pressfitted respectively on outer and inner bearing rings 4 and 7 on either side of loaded rolling element cage 11.

Figure 2:
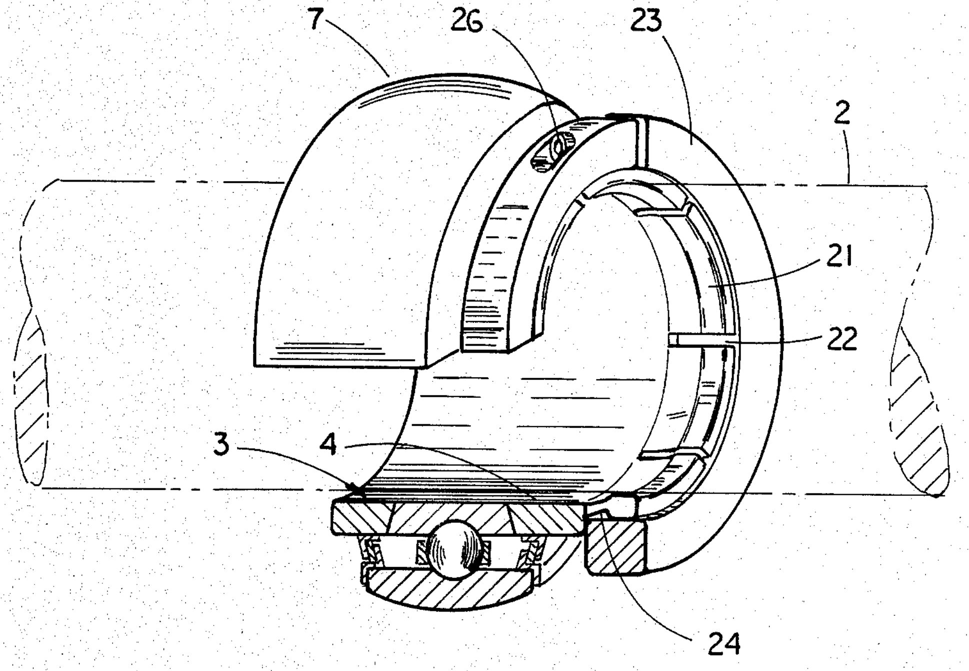
FIG. 2 is a somwhat reduced isometric view of the inventure bearing assembly and pillow block of FIG. 1 in locked position on the shaft.

As can be seen in FIG. 2 of the drawings, inner bearing ring 4 includes finger extensions 21 extending therefrom in annular cantilever fashion to surround shaft 2. These extensions are provided with a plurality of slots 22 parallel the axis of shaft rotation to permit radial compression by a surrounding slotted locking collar 23, a portion of which in FIG. 2 is broken away in order to disclose more fully the inner ring 4 and finger extensions 21 of the inner ring. As above noted, it is to be understood that the present invention contemplates the use of other locking force arrangements besides slotted collar 23 as well as use of a different number of finger ring extensions from that as disclosed.

As can be seen in the drawings, the breadth of collar 23 is substantially equal to the breadth of the inner ring finger extensions 21 which facilitates collar mounting during assembly to assure aligned seating or "squaring" of the collar but it is to be understood, for reasons explained hereinafter, that the collar breadth could be more or less. Pursuant to the present invention, inner ring finger extensions 21 are provided with an annular groove or recess 24 which extends annularly around the outer surface of the inner ring finger extensions in spaced relation from the cantilevered extremities of the extension. In the advantageous embodiment disclosed in the drawings, the breadth of groove 24 is approximately one half the breadth of locking collar 23 with the breadth of the groove extending to the main body of inner ring 4. It is only necessary that slot or recess 24 be of a minor depth to obtain the desired results of the present invention and, advantageously, a depth of 0.020 inches will suffice. Further, it is important that the slot not be so deep as to jeopardize the strength of the metal and the capability of the grooved or recessed area to accommodate bending torque.

As can be seen in FIG. 2, threaded in annular collar 23 to extend tangentially therethrough normal to the slot in collar 23 is screw 26, the screw being recessed to receive an hexagonal wrench for lineal adjustment thereof to obtain the desired tightening or loosening of collar 23 about inner ring finger extenisons 21. It is to be noted that the longitudinal axis of screw 26 is positioned immediately above and in alignment with that outer edge or shore of grove 24 closest to the cantilevered extremities of inner ring extensions 21 so as to maximize the force translated to that portion of the external surface of the inner ring finger extensions against which collar 23 abuts when screw 26 is tightened. Since approximately one half of collar 23 overlaps groove 24 shearing stress is reduced on the grooved or recessed area of the extensions and, instead, a bending stress occurs therealong, the resulting locking forces on shaft 2 being substantially greater than previously known to simulate a pressfit condition on the shaft.

It is to be understood that it would be possible to vary the slope and depth of the groove 24 depending on metal thickness, locking forces, metal strength and manufacturing techniques. It also would be possible to vary the breadth of the groove and to limit collar overlap of the groove without departing from the scope or spirit of the invention. In fact, it would be possible without departing from the scope of the present invention to employ a collar having a breadth equal to and positioned to clamp only that breadth of inner ring finger extensions between their cantilevered extremities and the outer shore of groove 24. Furthermore, and as above noted, it would also be possible to employ clamping or locking forces other than through a slotted collar.

The invention claimed is:

1. A bearing assembly comprising: inner and outer annular bearing rings, each including bearing raceways positioned in opposed annular spaced relation to each other; a rolling element loaded annular cage mounted in the space between said opposed raceways with the rolling elements therein engaging in said opposed raceways; said inner bearing ring including slotted inner ring finger extensions extending in cantilever fashion from at least one end thereof; and force means to compress said inner ring finger extensions when said inner ring finger extensions are mounted on a shaft to lock said inner ring tightly to said shaft; said inner ring finger extensions having a recessed annular grooved area extending at least partially therearound in spaced relation from the outer ends of said finger extensions of sufficient breadth and depth to convert what would otherwise be shearing stresses along such area to bending stresses and thus improve radial and thrust accommodation capacity and rotational torque transmission.

2. The apparatus of claim 1, said force means comprising a slotted compressible annular locking collar surrounding said inner ring finger extensions and tightening means therefor.

3. The apparatus of claim 1, said force means comprising a slotted compressible annular locking collar surrounding said inner ring finger extensions and a cap screw threaded in said collar to extend in a tangential manner thereto normal to the slot in said collar to tighten and loosen said collar, the longitudinal axis of said screw being positioned substantially immediately above and in alignment with said recessed groove edge closest to the outer ends of said finger extensions.

4. The apparatus of claim 1, said recessed annular grooved area extending around the outer surface of said finger extensions.

5. The apparatus of claim 1, said recessed groove having a depth of approximately 0.020 inches.

6. The apparatus of claim 1, said recessed groove having a breadth of approximately one half the breadth of said finger extensions.

7. The apparatus of claim 1, said locking collar having a breadth substantially equal to the breadth of said inner ring finger extensions.

8. The apparatus of claim 1 and inner and outer annular flingers press fitted to the opposite ends of the outer and inner ring with an annular seal disposed therebetween to seal said bearing assembly

9. A bearing assembly comprising: inner and outer annular bearing rings, each including bearing raceways positioned in opposed annular spaced relation to each other; a rolling element loaded annular cage mounted in the space between said opposed raceways with the rolling elements therein engaging in said opposed raceways; said inner bearing ring including slotted inner ring finger extensions extending in annular cantilever fashion from said inner ring beyond said outer ring; a slotted annular locking collar surrounding said annular inner ring finger extensions, the breadth of said collar being substantially equal to the breadth of said inner ring finger extensions; said inner ring finger extensions having a recessed annular groove extending around the outer surface thereof in spaced relation from the ends of said inner ring finger extensions, the breadth of said groove being approximately one half the breadth of said locking collar and the depth thereof being approximately 0.020 inches; a screw threaded in said slotted annular collar to extend in tangential manner thereto normal to the slot in said collar, the longitudinal axis of said screw positioned immediately above and in alignment with said recessed groove edge closest to the outer ends of said ring finger extensions thereby converting what would otherwise be shearing stress along the opposite edge of said groove to bending stress to improve bearing assembly radial and thrust accommodation capacity and rotational torque transmission; and inner and outer annular flingers pressfitted to opposite ends of the outer and inner rings with an annular seal disposed therebetween to seal said bearing assembly.

* * * * *